United States Patent
Liu et al.

(10) Patent No.: US 10,901,498 B2
(45) Date of Patent: *Jan. 26, 2021

(54) METHOD AND DEVICE FOR INPUTTING PASSWORD IN VIRTUAL REALITY SCENE

(71) Applicant: Advanced New Technologies Co., Ltd., Grand Cayman (KY)

(72) Inventors: Jie Liu, Hangzhou (CN); Jiajia Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,916

(22) Filed: Jul. 31, 2020

(65) Prior Publication Data

US 2020/0363864 A1    Nov. 19, 2020

Related U.S. Application Data

(63) Continuation of application No. 16/843,001, filed on Apr. 8, 2020, which is a continuation of application
(Continued)

(30) Foreign Application Priority Data

May 12, 2017    (CN) .......................... 2017 1 0335059

(51) Int. Cl.
| | |
|---|---|
| *G09G 5/00* | (2006.01) |
| *G06F 3/01* | (2006.01) |

(Continued)

(52) U.S. Cl.
CPC .......... *G06F 3/011* (2013.01); *G02B 27/0093* (2013.01); *G02B 27/017* (2013.01);
(Continued)

(58) Field of Classification Search
CPC ...... G06F 3/011; G06F 3/017; G06F 3/04815; G02B 27/0093; G02B 27/017; G02B 2027/014; G06T 19/006
See application file for complete search history.

(56) References Cited

U.S. PATENT DOCUMENTS

| | | |
|---|---|---|
| 6,091,378 A | 7/2000 | Richardson et al. |
| 6,388,657 B1 | 5/2002 | Natoli |

(Continued)

FOREIGN PATENT DOCUMENTS

| | | |
|---|---|---|
| CN | 101093525 | 12/2007 |
| CN | 102063245 | 5/2011 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Joe H Cheng
(74) *Attorney, Agent, or Firm* — Fish & Richardson P.C.

(57) ABSTRACT

In an implementation, inputting a password in a virtual reality (VR) scene is described. An interactive input interface in the VR scene for a user of a VR device is presented. The interface comprises multiple input units used for an overall input. Each input unit comprises one or more input elements. A determination is made that a user scene focus in the VR scene is on a selected input unit. A determination is made that a movement track of the user scene focus on the selected input unit satisfies an input condition. In response to a determination that the movement track of the user scene focus on the selected input unit satisfies the input condition, the input elements in the selected input unit are used as a part of an input password.

20 Claims, 5 Drawing Sheets

Related U.S. Application Data

No. 16/593,211, filed on Oct. 4, 2019, now Pat. No. 10,649,520, which is a continuation of application No. PCT/CN2018/086273, filed on May 10, 2018.

(51) Int. Cl.
- *G02B 27/00* (2006.01)
- *G02B 27/01* (2006.01)
- *G06F 3/0481* (2013.01)
- *G06T 19/00* (2011.01)

(52) U.S. Cl.
CPC .......... *G06F 3/017* (2013.01); *G06F 3/04815* (2013.01); *G06T 19/006* (2013.01); *G02B 2027/014* (2013.01)

(56) References Cited

U.S. PATENT DOCUMENTS

| | | | |
|---|---|---|---|
| 6,425,764 B1* | 7/2002 | Lamson | G16H 20/70 434/236 |
| 6,477,437 B1* | 11/2002 | Hirota | G06Q 10/10 700/108 |
| 9,285,874 B2 | 3/2016 | Bychkov et al. | |
| 9,396,318 B2* | 7/2016 | Kowaka | G06F 21/36 |
| 9,529,923 B1 | 12/2016 | Baird, III | |
| 9,560,967 B2* | 2/2017 | Hyde | A61B 5/0537 |
| 10,474,242 B2* | 11/2019 | Yin | G06F 3/04886 |
| 10,649,520 B2 | 5/2020 | Liu et al. | |
| 2008/0170776 A1 | 7/2008 | Albertson et al. | |
| 2011/0221896 A1 | 9/2011 | Haddick et al. | |
| 2013/0154913 A1 | 6/2013 | Gene et al. | |
| 2013/0263036 A1 | 10/2013 | Berenson et al. | |
| 2013/0265222 A1 | 10/2013 | Berenson et al. | |
| 2013/0283213 A1 | 10/2013 | Guendelman et al. | |
| 2014/0126782 A1 | 5/2014 | Takai et al. | |
| 2015/0116353 A1 | 4/2015 | Miura et al. | |
| 2015/0212322 A1 | 7/2015 | Moravetz | |
| 2015/0220142 A1 | 8/2015 | Parkinson et al. | |
| 2015/0261968 A1 | 9/2015 | Polyachenko | |
| 2016/0098579 A1 | 4/2016 | Ballard et al. | |
| 2016/0105413 A1* | 4/2016 | Yasaki | G06F 21/41 726/6 |
| 2016/0253044 A1 | 9/2016 | Katz | |
| 2016/0330031 A1 | 11/2016 | Drego et al. | |
| 2016/0342977 A1 | 11/2016 | Lam | |
| 2017/0083860 A1 | 3/2017 | Sriram et al. | |
| 2018/0173323 A1 | 6/2018 | Harvey et al. | |
| 2018/0300108 A1 | 10/2018 | Goldman et al. | |
| 2019/0362063 A1 | 11/2019 | Wu | |
| 2020/0033939 A1 | 1/2020 | Liu et al. | |
| 2020/0233488 A1 | 7/2020 | Liu et al. | |

FOREIGN PATENT DOCUMENTS

| | | |
|---|---|---|
| CN | 103076988 | 5/2013 |
| CN | 103809743 | 5/2014 |
| CN | 103902029 | 7/2014 |
| CN | 105488675 | 4/2016 |
| CN | 105511618 | 4/2016 |
| CN | 105790954 | 7/2016 |
| CN | 105955470 | 9/2016 |
| CN | 105955478 | 9/2016 |
| CN | 106293063 | 1/2017 |
| CN | 106406708 | 2/2017 |
| CN | 106453281 | 2/2017 |
| CN | 106534273 | 3/2017 |
| CN | 106534317 | 3/2017 |
| CN | 107368184 | 11/2017 |
| JP | 2008527528 | 7/2008 |
| JP | 2014010663 | 1/2014 |
| JP | 2014092940 | 5/2014 |
| JP | 2016526237 | 9/2016 |
| KR | 20090021876 | 3/2009 |
| TW | 201627889 | 8/2016 |
| WO | WO 2018205968 | 11/2018 |

OTHER PUBLICATIONS

Extended European Search Report in European Application No. 18798639.3, dated Oct. 16, 2019, 10 pages.

Nakamoto, "Bitcoin: A Peer-to-Peer Electronic Cash System," www.bitcoin.org, 2005, 9 pages.

PCT International Preliminary Report on Patentability in International Application No. PCT/CN2018/086273, dated Nov. 12, 2019, 9 pages (with English translation).

PCT International Search Report and Written Opinion in International Application No. PCT/CN2018/086273, dated Jul. 26, 2018, 13 pages (with English translation).

* cited by examiner

METHOD AND DEVICE FOR INPUTTING PASSWORD IN VIRTUAL REALITY SCENE

CROSS-REFERENCE TO RELATED APPLICATIONS

This application is a continuation of U.S. patent application Ser. No. 16/843,001, filed Apr. 8, 2020, now allowed, which is a continuation of U.S. patent application Ser. No. 16/593,211, filed on Oct. 4, 2019, now U.S. Pat. No. 10,649,520, issued May 12, 2020, which is a continuation of PCT Application No. PCT/CN2018/086273, filed on May 10, 2018, which claims priority to Chinese Patent Application No. 201710335059.X, filed on May 12, 2017, and each application is hereby incorporated by reference in its entirety.

TECHNICAL FIELD

The present application relates to the field of network technologies, and in particular, to a method and a device for inputting a password in a virtual reality (VR) scene.

BACKGROUND

VR is a computer simulation system that can be used to create and experience a virtual world. VR generates a simulated environment by using a computer, and is a system simulation of multi-source information integration, an interactive three-dimensional dynamic vision, and entity behavior, so that a user can be immersed in the environment. Currently, the VR technology has been widely used in many fields such as games, industry, and shopping. In some application scenarios, a password needs to be input. For example, when some functions are enabled in a VR scene, password verification can be performed.

A method for inputting a password in the existing technology can be as follows: A virtual keyboard is presented in front of the user in the VR scene, and if a gaze focus of the user stays at a character on the keyboard for more than a certain time, it indicates that the character is input. However, a disadvantage of the method is that a misoperation is easily performed, for example, a misoperation is easily performed when the user is thinking or when the focus of the user accidentally stays at a virtual key in a process of taking off a VR device. In addition, a password input time is long in the method. When a password of the user includes relatively more characters, the user needs to perform a plurality of times of input. In addition, because the user needs to make the focus stay at a virtual key for a specific time before the user triggers input, if a stay time determining threshold is relatively small, a misoperation probability is relatively high; or if a stay time determining threshold is relatively large, an input process is relatively slow.

SUMMARY

In view of this, the present application provides a method and a device for inputting a password in a virtual reality (VR) scene, so that a password can be input quickly and accurately.

The present application is implemented by using the following technical solutions.

According to a first aspect, a method for inputting a password in a VR scene is provided, where the method includes: presenting an interactive input interface in a VR scene, where the interactive input interface includes a plurality of input units used for overall input, and where each input unit includes at least one input element; determining that a user scene focus in the VR scene is placed at one of the input units and the user scene focus performs focus movement on the input unit; and when determining that a movement track of the focus movement satisfies an input condition, determining to use all input elements in the input unit as a part of an input password.

According to a second aspect, a device for inputting a password in a VR scene is provided, where the device includes: an interface presentation module, configured to present an interactive input interface in a VR scene, where the interactive input interface includes a plurality of input units used for overall input, and where each input unit includes at least one input element; a focus identification module, configured to determine that a user scene focus in the VR scene is placed at one of the input units and the user scene focus performs focus movement on the input unit; and an input determining module, configured to: when determining that a movement track of the focus movement satisfies an input condition, determine to use all input elements in the input unit as a part of an input password.

According to a third aspect, a VR device is provided, where the VR device includes a memory, a processor, and a computer instruction that is stored in the memory and can run on the processor, and the processor executes the instruction to implement the following steps: presenting an interactive input interface in a VR scene, where the interactive input interface includes a plurality of input units used for overall input, and where each input unit includes at least one input element; determining that a user scene focus in the VR scene is placed at one of the input units and the user scene focus performs focus movement on the input unit; and when determining that a movement track of the focus movement satisfies an input condition, determining to use all input elements in the input unit as a part of an input password.

According to the method and the device for inputting a password in a VR scene in the present application, selection of an input element is determined by using an interactive action of a user in the interactive input interface. Compared with the gaze-based selection method in the existing technology, a misoperation probability can be reduced, and a password can be accurately input.

DESCRIPTION OF IMPLEMENTATIONS

With the gradual development, the virtual reality (VR) technology has been widely used in many fields such as games, industry, and shopping. In addition, a password needs to be input in some scenarios. VR shopping is used as an example. A previous method is as follows: A user views a product in a VR environment, memorizes a model after selecting the product, takes off VR glasses, and purchases the product on a computer or a mobile phone, where VR is only a method for displaying the product. To facilitate a user operation and improve user experience, payment can be directly performed in the VR environment. Therefore, password input is involved when payment is performed in the VR environment. The present application provides a method for inputting a password in a VR scene. However, it can be understood that the VR shopping is only one application of password input, and the method can also be applied to another scenario.

The VR scene is a virtual three-dimensional space world simulated by using a three-dimensional computer technology, and it integrates a visual simulated environment, an auditory simulated environment, a tactile simulated environment, and other sensory simulated environments, so that an operator can have immersive experience and complete an operation by using VR software and hardware. In the solutions of the present application, an interactive input interface can be presented in three-dimensional space of the VR scene. The interactive input interface here can have at least two features. First, the interface is used for password input, and therefore is referred to as an input interface. Second, the interface is interactive, that is, the user can perform an operation in the interface, and the interface can obtain the operation of the user and identify a corresponding operation intent.

Figure 1:
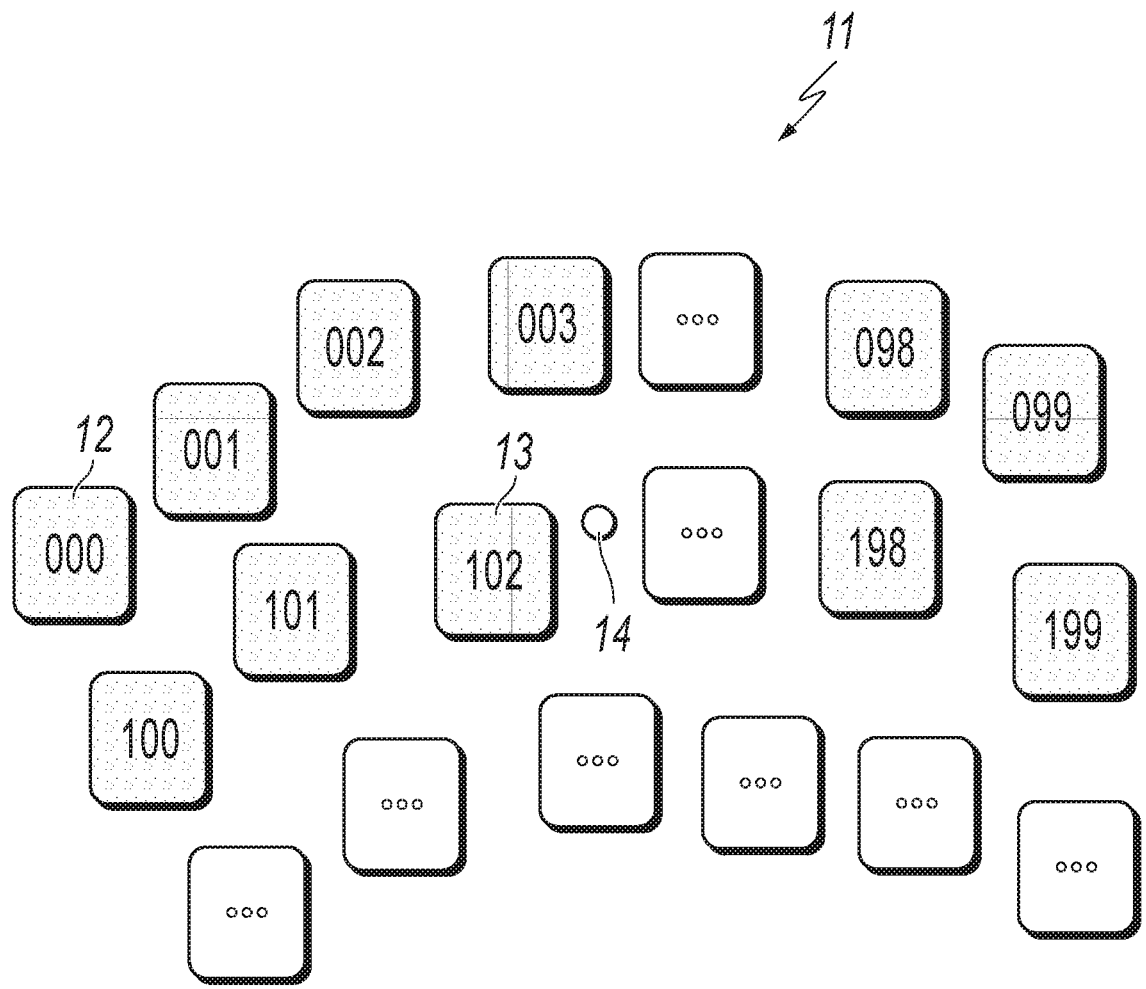
FIG. 1 is a schematic diagram illustrating a password input interface, according to an implementation of the present application.

Input of a six-digit password is used as an example. Referring to FIG. 1, to implement input of the six-digit password (for example, 199320), interactive input interface 11 including a plurality of input units can be displayed in the VR scene, for example, interactive input interface 11 can include input unit 12, input unit 13, etc. In an example, when the input units are presented in the VR three-dimensional space, the input units can be displayed based on a predetermined arrangement order. For example, as shown in FIG. 1, the input units can be displayed in ascending order of 000 to 999. However, the arrangement order in FIG. 1 is not limited, and the input units can be arranged based on an order that can help the user quickly find a target digit that the user expects to input.

When inputting the password, the user can perform an interactive operation by using the input units in the interactive input interface, and each input unit can be used for overall input. Input unit 12 is used as an example. If the user selects input unit 12, the user can input three digits "000" at a time. If the user selects input unit 13, the user can input three digits "102" at a time. That is, all input elements in each input unit can be used as a part of the password through overall input.

In the example shown in FIG. 1, all the input elements in the input unit are digits. In another example, the input element can be a character such as A or b, or can be an image or other forms. In addition, in the example in FIG. 1, one input unit includes three input elements. In another example, each input unit can include at least one input element. The six-digit password in FIG. 1 is still used as an example. Two digits can be set in each input unit; or some input units include two digits, some input units include three digits, and even some input units include four digits. In the example in the present application, a form or a quantity of the input element in the input unit is not strictly limited. However, when there are at least two input elements in one input unit, the user can input at least two elements at a time during input, so that input efficiency can be improved compared with that in a method for inputting a single-digit password.

Figure 2:
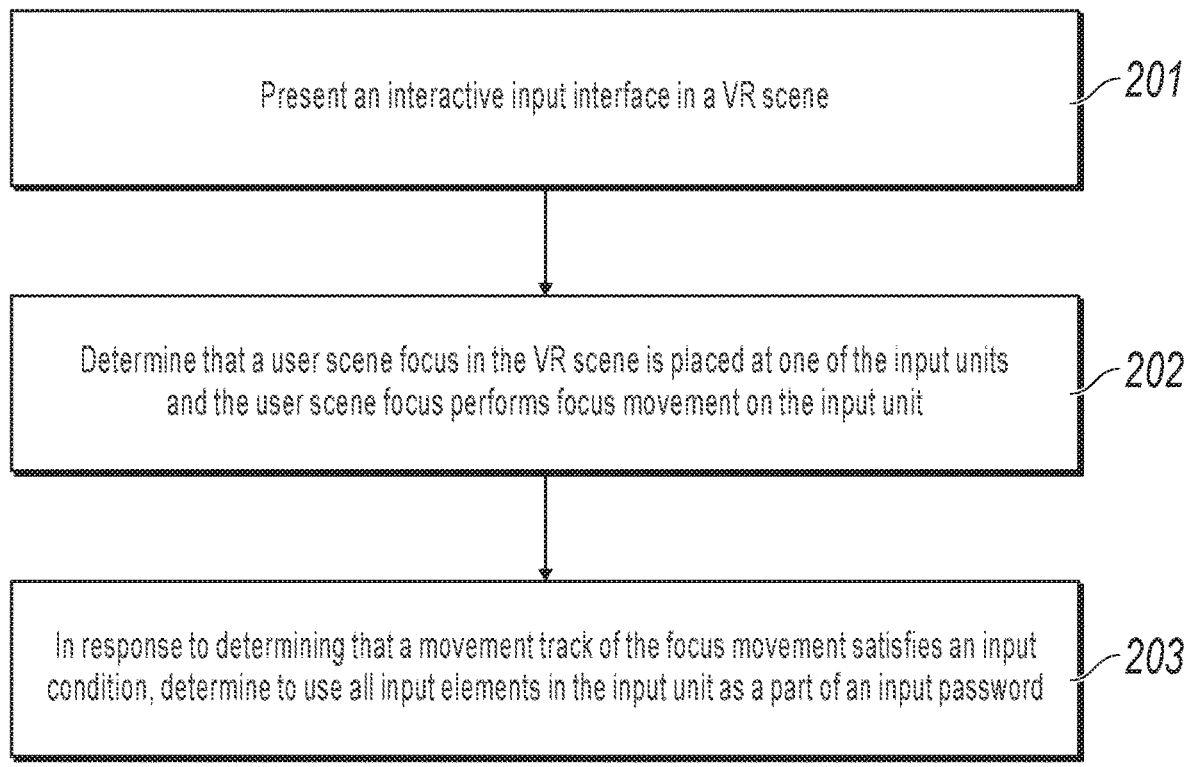
FIG. 2 is a flowchart illustrating password input, according to an implementation of the present application.

The interactive input interface can be displayed by a device for inputting a password in the present application. In an example, the device for inputting a password can be implemented in a form of software. The device can further identify interaction between the user and the interactive input interface, and implement password input based on the interaction. FIG. 2 shows a password input procedure executed by the device for inputting a password in the present example. The procedure can include the steps below.

Step 201. Present an interactive input interface in a VR scene.

For example, as shown in FIG. 1, a plurality of input units can be presented in VR three-dimensional space.

Step 202. Identify that a user scene focus in the VR scene is placed at one of the input units and the user scene focus performs focus movement on the input unit.

In the present step, the user scene focus in the VR scene can be a gaze focus of a user, or can be a device control focus controlled by using a VR input device. For example, the gaze focus can be a dot drawn in the VR scene, for example, focus 14 in FIG. 1. The dot represents the gaze focus of the user. Focus 14 can be initially placed at a random location in the three-dimensional space, and the user can move the focus by turning around, raising the head, lowering the head, etc. For another example, the user can control focus 14 to move by using an input device such as a matching handle or controller provided by some dedicated VR devices.

The user can control focus 14 to be placed at one of the input units through gazing or by using the input device, and can further control the user scene focus to perform focus movement on the input unit. There can be a plurality of focus movement methods here, for example, controlling the focus to rotate clockwise or to rotate counterclockwise, or drawing a predetermined graphic around the input unit. No limitation is imposed on the focus movement method.

However, in the present step, that the user scene focus is placed at on one of the input units can be as follows: When the user expects to input some elements in a password input process, the user places the focus at an input unit that includes the element. For example, when the user expects to input 000, the user can control, through gazing or by using the input device, focus 14 in FIG. 1 to be placed at input unit 12. In addition, if the user performs focus movement on an input unit, it can indicate that the user expects, through the interactive movement, to select and input an element in the input unit as a part of a password. The device for inputting a password can identify the interactive movement. For details, references can be to step 203 below.

Step 203. When determining that a movement track of the focus movement satisfies an input condition, determine to use all input elements in the input unit as a part of an input password.

Figure 3:
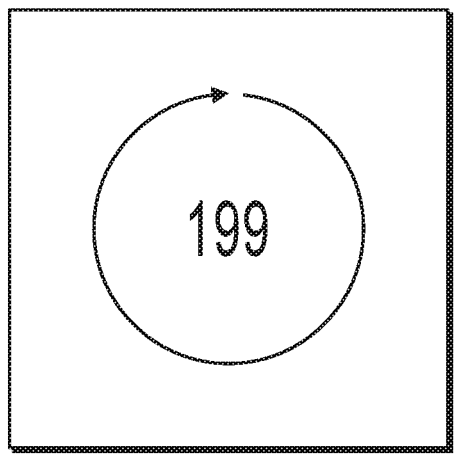
FIG. 3 is a schematic diagram illustrating a password input interaction method, according to an implementation of the present application.

In the present example, the input condition can be set. When the focus movement track in step 202 satisfies the input condition, it is determined that the user expects to input all the input elements in the input unit. For example, the input condition can be that the movement track is a circular track around all the input elements in the input unit. Referring to an example in FIG. 3, the user can control focus 14 to rotate clockwise to complete selection. When focus 14 rotates around "199" in an input unit, it can be determined that the user needs to input "199" as a part of the password.

In another example, the focus movement track limited by the input condition can be in other forms, for example, a square track and a triangular track. No limitation is imposed.

In addition, in a password input process, a multi-digit password can be split into several segments, so that the user inputs one segment through one time of interaction. A six-digit password is used as an example. Assume that the password is 199320. The password can be split into two three-digit numbers: "199" and "320". Both the two three-digit numbers can be found, selected, and input by using the input unit in the example in FIG. 1. Alternatively, the password can be split into three two-digit numbers: "19", "93", and "20", and the three numbers are simultaneously displayed in the interactive input interface. An input unit including a two-digit number can be displayed in the VR three-dimensional space, that is, each input unit in FIG. 1 can be replaced with a unit including a two-digit number such as "00", "01", or "02", or even some input units include a two-digit number (for example, "19" or "02") and some input units include a three-digit number (for example, "338" or "390"), provided that the user can find an input unit including password content that the user expects to input.

Input of the password 199320 is still used as an example. The device for inputting a password in the present application can identify that the user selects at least two input units, and obtain all input elements in the at least two input units. The device for inputting a password can combine all the input elements based on an order of obtaining the at least two input units, to obtain the input password. For example, if the user first selects "199" and then selects "320", the password "199320" can be obtained based on the order. If the user first inputs "320" by using the movement track and then inputs "199", an obtained password is "320199".

In the method for inputting a password in the present example, selection of an input element is determined by using an interactive action of the user in the interactive input interface. Compared with the gaze-based selection method in the existing technology, a misoperation probability can be reduced, and a password can be accurately input. In addition, each input unit includes at least one input element, so that the password can be input more quickly. Furthermore, compared with long-time gazing in the gaze-based selection method, a speed of an input process can also be improved in the interactive selection and input method. It should be worthwhile to further note that, in the method for inputting a password in the present example, the user scene focus can be the gaze focus or the device control focus, so that the method is applicable to both a VR scene with an input device and a VR scene without an input device, and an application range is relatively wide.

An execution sequence of the steps in the procedure shown in FIG. 2 is not limited to a sequence in the flowchart. In addition, descriptions of the steps can be implemented in a form of software, hardware, or a combination thereof. For example, a person skilled in the art can implement the descriptions in a form of software code, and the code can be a computer executable instruction that can implement logical functions corresponding to the steps. When the descriptions are implemented in the form of software, the executable instruction can be stored in a memory and executed by a processor in a device.

For example, corresponding to the method, the present application also provides a VR device. The device can include a processor, a memory, and a computer instruction that is stored in a memory and can run on the processor. The processor executes the instruction to implement the following steps: presenting an interactive input interface in a VR scene, where the interactive input interface includes a plurality of input units used for overall input, and where each input unit includes at least one input element; determining that a user scene focus in the VR scene is placed at one of the input units and the user scene focus performs focus movement on the input unit; and when determining that a movement track of the focus movement satisfies an input condition, determining to use all input elements in the input unit as a part of an input password.

Figure 4:
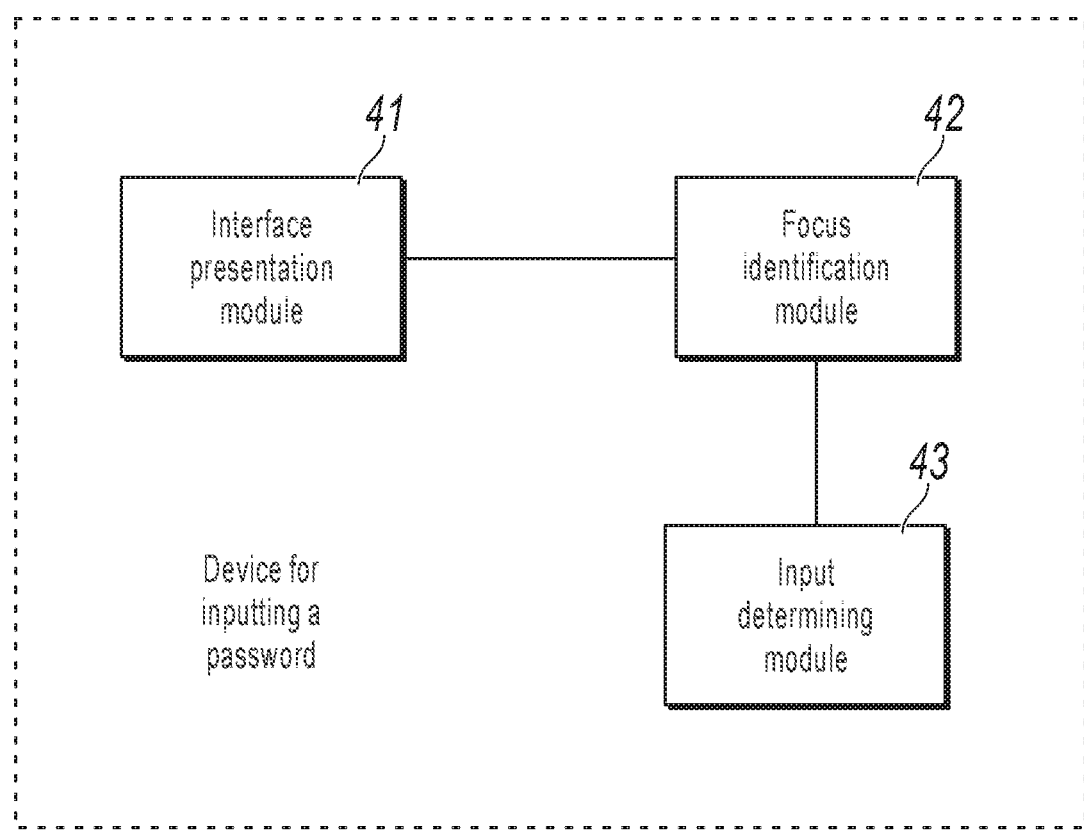
FIG. 4 is a structural diagram illustrating a device for inputting a password in a VR scene, according to an implementation of the present application.

The present application further provides a device for inputting a password in a VR scene. As shown in FIG. 4, the device for inputting a password can include an interface presentation module 41, a focus identification module 42, and an input determining module 43.

The interface presentation module 41 is configured to present an interactive input interface in a VR scene, where the interactive input interface includes a plurality of input units used for overall input, and where each input unit includes at least one input element.

The focus identification module 42 is configured to determine that a user scene focus in the VR scene is placed at one of the input units and the user scene focus performs focus movement on the input unit.

The input determining module 43 is configured to: when determining that a movement track of the focus movement satisfies an input condition, determine to use all input elements in the input unit as a part of an input password.

In an example, the input determining module 43 is configured to: when determining that the movement track is a circular track around all the input elements in the input unit, determine that the movement track of the focus movement satisfies the input condition.

In an example, the input determining module 43 is further configured to: in a password input process, identify that a user selects at least two input units, and obtain all input elements in the at least two input units; and combine all the input elements based on an order of obtaining the input elements by the at least two input units, to obtain the input password.

In an example, the user scene focus includes a gaze focus of a user or a device control focus controlled by using a VR input device.

The apparatuses or modules described in the previous implementations can be implemented by a computer chip or an entity, or can be implemented by a product with a certain function. A typical implementation device is a computer, and the computer can be a personal computer, a laptop computer, a cellular phone, a camera phone, a smartphone, a personal digital assistant, a media player, a navigation device, an email sending/receiving device, a game console, a tablet computer, a wearable device, or any combination of these devices.

For ease of description, the previous apparatus is described by dividing the apparatus into various modules based on functions. Certainly, when the present application is implemented, the functions of the modules can be implemented in one or more pieces of same software and/or hardware.

In addition, the password input procedure shown in FIG. 2 can be further included in a computer readable storage medium. The medium stores a machine readable instruction corresponding to password input control logic, the medium can be connected to a processing device that executes the instruction, and the instruction stored in the medium can be executed by the processing device.

In the present application, the computer readable storage medium can be in a plurality of forms. In different examples, the machine readable storage medium can be a random access memory (RAM), a volatile memory, a non-volatile memory, a flash memory, a storage drive (such as a hard disk drive), a solid state drive, any type of storage disk (such as an optical disc or a DVD) or a similar storage medium, or a combination of the devices. In particular, the computer readable medium can also be a paper or another suitable medium that can print a program. When the media are used, these programs can be obtained electrically (for example, through optical scanning), can be compiled, interpreted, and processed by using a suitable method, and then can be stored in a computer medium.

The previous descriptions are merely examples of implementations of the present application, but are not intended to limit the present application. Any modification, equivalent replacement, or improvement made without departing from the spirit and principle of the present application should fall within the protection scope of the present application.

Figure 5:
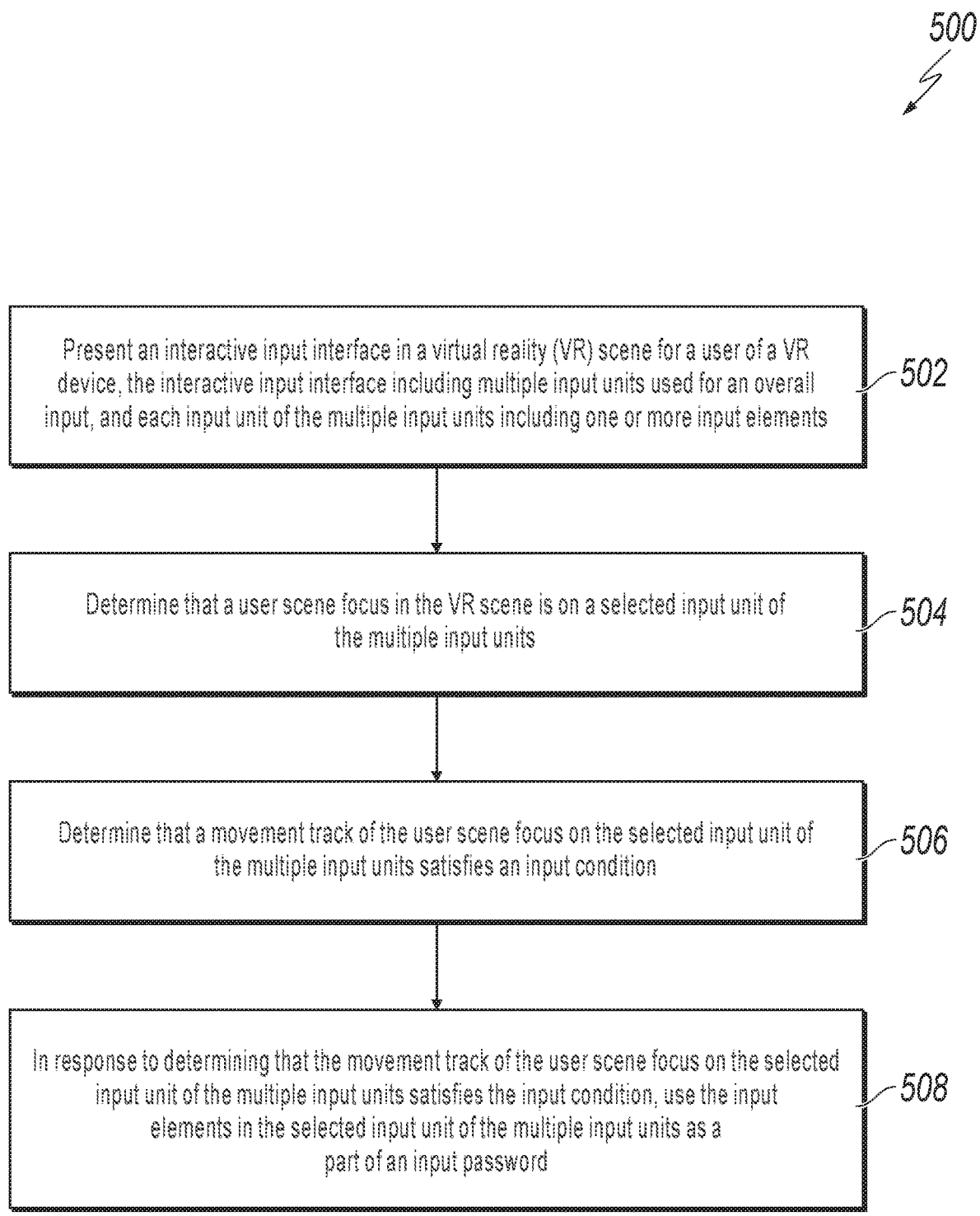
FIG. 5 is a flowchart illustrating an example of a computer-implemented method for password input interaction in a virtual reality (VR) scene, according to an implementation of the present disclosure.

FIG. 5 is a flowchart illustrating an example of a computer-implemented method 500 for password input interaction in a virtual reality (VR) scene, according to an implementation of the present disclosure. For clarity of presentation, the description that follows generally describes method 500 in the context of the other figures in this description. However, it will be understood that method 500 can be automatically performed, for example, by any system, environment, software, and hardware, or a combination of systems, environments, software, and hardware, as appropriate. In some implementations, various steps of method 500 can be run in parallel, in combination, in loops, or in any order.

At 502, an interactive input interface is presented in a virtual reality (VR) scene for a user of a VR device. In some implementations, the interactive input interface can include multiple input units used for an overall input. Each input unit of the multiple input units comprises one or more input elements. For example, the multiple input units used for the overall input can be automatically displayed in a three-dimensional (3D) space of the VR scene based on a predetermined arrangement order. In some implementations, an input element can include at least one of a digit, a character, or an image. For example, when a user wears a VR device, multiple input units can be displayed in a VR scene. Each input unit can show, for example, three numbers. The use can select, for example, three displayed input units to input a nine-digit password. From 502, method 500 proceeds to 504.

At 504, a determination is made that a user scene focus in the VR scene is on a selected input unit of the multiple input units. In some implementations, the user scene focus can include a gaze focus of the user of the VR device or a device control focus controlled by using an input device of the VR device. In some implementations, each input unit of the multiple input units can include at least three input elements. From 504, method 500 proceeds to 506.

At 506, a determination is made that a movement track of the user scene focus on the selected input unit of the multiple input units satisfies an input condition. For example, the VR device can determine that the user wearing the VR device moves his/her head to move the user scene focus on the selected input unit. In some implementations, the movement track can include at least one of a circular track, a square track, a triangular track, and a drawing of a predetermined graphic. For example, if the movement track is a circular track, a determination can be automatically made as to whether the movement track is a circular track around all the displayed input elements in the selected input unit of the multiple input units. In some implementations, the circular track can be a clockwise track or a counterclockwise track. In some implementations, the input condition can be predetermined to define a geometry of an input movement track relative to input elements of an input unit. From 506, method 500 proceeds to 508.

At 508, in response to a determination that the movement track of the user scene focus on the selected input unit of the multiple input units satisfies the input condition, the input elements in the selected input unit of the multiple input units are used as a part of an input password. In some implementations, all input elements in the selected input unit of the multiple input units are automatically selected and used (or input) as a part of an input password. In some implementations, if an input password is a long password (such as, an eight-digit password), the input password can be split into multiple segments. Each segment of the multiple segments is input through a single user interaction. For example, for a nine-digit password, a user may perform three input interactions, each interaction for inputting three digits, to input the nine-digit password.

In some implementations, in a password input process, at least two input units of the multiple input units selected by a user can be identified. Input elements in the at least two input units of the multiple input units can be obtained. Based on an order of obtaining the at least two input units of the multiple input units, the input elements in the at least two input units of the multiple input units can be automatically combined to obtain the input password. In some implementations, all input elements in the at least two input units of the multiple input units can be combined to obtain the whole input password. After 508, method 500 stops.

Password verification can be used to provide security in a virtual reality (VR) scene. Normally, a virtual keyboard is presented in front of a user in the VR scene. If a gaze focus of the user stays at a virtual key on the virtual keyboard for more than a certain time, a character of the virtual key is inputted. However, inputting password by focusing on individual virtual keys can be error prone and take a long time for a long password. The subject matter described in this specification provides a fast and accurate password inputting method in a VR scene. For example, an interactive input interface is presented in a VR scene with multiple input unites. Each input unit includes one or more input elements. Selection of an input element is determined by using an interactive action of the user in the interactive input interface (such as a clockwise movement on the input element). As a result, inputting error and inputting time can be reduced, thereby improving password inputting accuracy, password inputting efficiency, and user experience during password verification process in a VR scene.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   presenting an interactive input interface in a virtual reality (VR) scene for a user of a VR device, wherein the interactive input interface comprises a plurality of input units used for an overall input, and wherein each input unit of the plurality of input units comprises one or more input elements;
   in a password input process, identifying that the user selects at least two input units of the plurality of input units;
   obtaining input elements in the at least two input units of the plurality of input units; and
   combining, based on an order of obtaining the at least two input units of the plurality of input units, the input elements in the at least two input units of the plurality of input units to obtain an input password.

2. The computer-implemented method of claim 1, wherein an input element includes at least one of a digit, a character, or an image, wherein the input password is split into a plurality of segments, and wherein each segment of the plurality of segments is input through a single interaction.

3. The computer-implemented method of claim 1, wherein presenting the interactive input interface in the VR scene comprises:
   presenting the plurality of input units used for the overall input in a three-dimensional space of the VR scene based on a predetermined arrangement order.

4. The computer-implemented method of claim 1, further comprising:
   determining that a user scene focus in the VR scene is on a selected input unit of the plurality of input units;
   determining that a movement track of the user scene focus on the selected input unit of the plurality of input units satisfies an input condition; and
   in response to determining that the movement track of the user scene focus on the selected input unit of the plurality of input units satisfies the input condition, using the input elements in the selected input unit of the plurality of input units as a part of the input password.

5. The computer-implemented method of claim 4, wherein the movement track includes at least one of a circular track, a square track, a triangular track, and a drawing of a predetermined graphic.

6. The computer-implemented method of claim 4, wherein determining that the movement track of the user scene focus on the selected input unit of the plurality of input units satisfies the input condition comprises:
   determining that the movement track is a circular track around all the input elements in the selected input unit of the plurality of input units, wherein the circular track is a clockwise track or a counterclockwise track.

7. The computer-implemented method of claim 4, wherein the user scene focus comprises a gaze focus of the user or a device control focus controlled by using an input device of the VR device, and each input unit of the plurality of input units comprises at least three input elements.

8. A non-transitory, computer-readable medium storing one or more instructions executable by a computer system to perform operations comprising:
   presenting an interactive input interface in a virtual reality (VR) scene for a user of a VR device, wherein the interactive input interface comprises a plurality of input units used for an overall input, and wherein each input unit of the plurality of input units comprises one or more input elements;
   in a password input process, identifying that the user selects at least two input units of the plurality of input units;
   obtaining input elements in the at least two input units of the plurality of input units; and
   combining, based on an order of obtaining the at least two input units of the plurality of input units, the input elements in the at least two input units of the plurality of input units to obtain an input password.

9. The non-transitory, computer-readable medium of claim 8, wherein an input element includes at least one of a digit, a character, or an image, wherein the input password is split into a plurality of segments, and wherein each segment of the plurality of segments is input through a single interaction.

10. The non-transitory, computer-readable medium of claim 8, wherein presenting the interactive input interface in the VR scene comprises:
    presenting the plurality of input units used for the overall input in a three-dimensional space of the VR scene based on a predetermined arrangement order.

11. The non-transitory, computer-readable medium of claim 8, the operations further comprising:
    determining that a user scene focus in the VR scene is on a selected input unit of the plurality of input units;
    determining that a movement track of the user scene focus on the selected input unit of the plurality of input units satisfies an input condition; and
    in response to determining that the movement track of the user scene focus on the selected input unit of the plurality of input units satisfies the input condition, using the input elements in the selected input unit of the plurality of input units as a part of the input password.

12. The non-transitory, computer-readable medium of claim 11, wherein the movement track includes at least one of a circular track, a square track, a triangular track, and a drawing of a predetermined graphic.

13. The non-transitory, computer-readable medium of claim 11, wherein determining that the movement track of the user scene focus on the selected input unit of the plurality of input units satisfies the input condition comprises:
    determining that the movement track is a circular track around all the input elements in the selected input unit of the plurality of input units, wherein the circular track is a clockwise track or a counterclockwise track.

14. The non-transitory, computer-readable medium of claim 11, wherein the user scene focus comprises a gaze focus of the user or a device control focus controlled by using an input device of the VR device, and each input unit of the plurality of input units comprises at least three input elements.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        presenting an interactive input interface in a virtual reality (VR) scene for a user of a VR device, wherein the interactive input interface comprises a plurality of input units used for an overall input, and wherein each input unit of the plurality of input units comprises one or more input elements;

in a password input process, identifying that the user selects at least two input units of the plurality of input units;

obtaining input elements in the at least two input units of the plurality of input units; and combining, based on an order of obtaining the at least two input units of the plurality of input units, the input elements in the at least two input units of the plurality of input units to obtain an input password.

16. The computer-implemented system of claim 15, wherein an input element includes at least one of a digit, a character, or an image, wherein the input password is split into a plurality of segments, and wherein each segment of the plurality of segments is input through a single interaction.

17. The computer-implemented system of claim 15, wherein presenting the interactive input interface in the VR scene comprises:

presenting the plurality of input units used for the overall input in a three-dimensional space of the VR scene based on a predetermined arrangement order.

18. The computer-implemented system of claim 15, the operations further comprising:

determining that a user scene focus in the VR scene is on a selected input unit of the plurality of input units;

determining that a movement track of the user scene focus on the selected input unit of the plurality of input units satisfies an input condition; and in response to determining that the movement track of the user scene focus on the selected input unit of the plurality of input units satisfies the input condition, using the input elements in the selected input unit of the plurality of input units as a part of the input password.

19. The computer-implemented system of claim 18, wherein the movement track includes at least one of a circular track, a square track, a triangular track, and a drawing of a predetermined graphic.

20. The computer-implemented system of claim 18, wherein determining that the movement track of the user scene focus on the selected input unit of the plurality of input units satisfies the input condition comprises:

determining that the movement track is a circular track around all the input elements in the selected input unit of the plurality of input units, wherein the circular track is a clockwise track or a counterclockwise track.

* * * * *

UNITED STATES PATENT AND TRADEMARK OFFICE
CERTIFICATE OF CORRECTION

Page 1 of 1

PATENT NO. : 10,901,498 B2
APPLICATION NO. : 16/944916
DATED : January 26, 2021
INVENTOR(S) : Jie Liu and Jiajia Li It is certified that error appears in the above-identified patent and that said Letters Patent is hereby corrected as shown below:

On the Title Page

Related U.S. Application Data, item (63), After "2020," insert -- now Pat. No. 10,788,891, --.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*